Patented Mar. 20, 1951

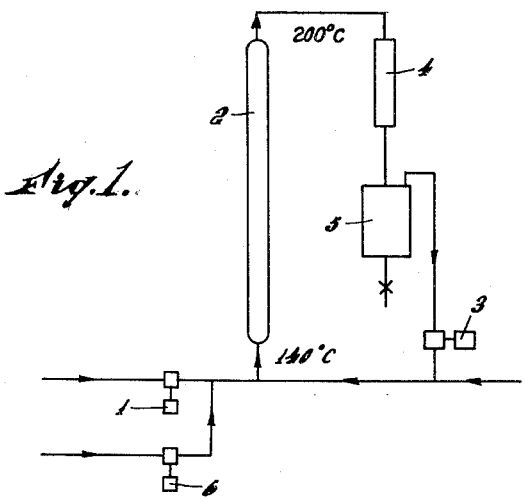
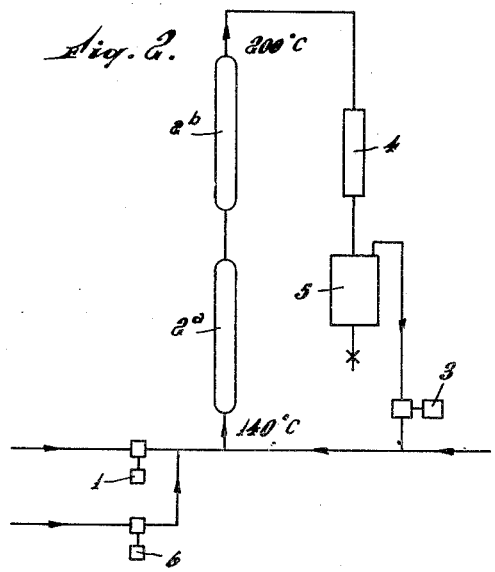

2,546,103

UNITED STATES PATENT OFFICE 2,546,103

PROCESS OF MANUFACTURING HEXITOLS BY CATALYTIC REDUCTION OF CARBOHYDRATES

Jan Lolkema, Hoogezand, Hendrik Adriaan van Westen, Amsterdam, and Johannes Cornelis Vlugter, Overveen, Netherlands, assignors to Naamlooze Vennootschap: W. A. Scholten's Chemische Fabrieken, Groningen, Netherlands, a corporation of the Netherlands Application April 21, 1947, Serial No. 742,954
In the Netherlands January 30, 1942

4 Claims. (Cl. 260—635)

The present invention relates to a process of manufacturing hexitol or a mixture of isomeric hexitols by catalytical reduction of carbohydrates in the liquid phase.

It is known to produce polyhydric alcohols, e. g. sorbitol, from carbohydrates by reduction with hydrogen or hydrogen containing gases in the presence of catalysts, such as nickel, copper and cobalt, or the oxides thereof. If desired the said catalysts may be combined with other substances, such as metal oxides that are difficult to reduce, e. g. oxides of chromium, aluminum and tungsten, and/or with carrier materials such as diatomaceous earth and the like. Reduction is generally carried out at temperatures of about 100–200° C., and generally at a high hydrogen pressure (more than 20 atm.).

The carbohydrates may be submitted to the reduction treatment in an anhydrous form or in the form of a solution or a suspension, e. g. an aqueous or dilute alcoholic solution.

It is also known to carry out the said reaction continuously by causing the material to be reduced in which the catalyst has been suspended to flow together with hydrogen through the reaction chamber or through a series of reaction tubes in which the temperature and pressure desired for the reduction are maintained.

If this method is applied to products of the hydrolysis of starch one will experience difficulties. The said products of hydrolysis, e. g. commercial glucose, contain, besides glucose, also maltose and dextrins, which, in order to be converted into sorbitol, require a higher temperature than pure glucose. It was found that in order to obtain a satisfactory reduction of the maltose and the dextrins into sorbitol, it will be necessary to use a comparatively high temperature, e. g. 180–200° C. This temperature, however, is too high for glucose, the reduction of which will already proceed very well at a temperature of about 120–160° C., whereas at temperatures of e. g. 180° C. and above, the glucose is apt to caramelize.

According to the invention it is possible to reduce commercial glucose and similar mixtures of glucose with maltose and/or dextrins with high yield of a pure, uncoloured or only slightly coloured sorbitol, if the reaction temperature is raised continuously or in steps from the inlet end to the outlet end of the reaction chamber.

In the first part of the process the glucose is reduced at a comparatively low temperature without any undesirable secondary reactions; the polysaccharides, more particularly the dextrins, are only very incompletely reduced under these conditions, as the temperature is too low for a complete reduction thereof. When, however, the glucose has disappeared for the greater part, the reaction mixture will enter a zone of higher temperature where the maltose and dextrons will be readily reduced. In this way there is obtained a final product in which all carbohydrates have been practically completely reduced to hexitols without the glucose present in the starting material giving rise to undesirable secondary reactions. The chief reaction product is sorbitol, but small quantities of other hexitols such as mannitol, are also formed owing to the secondary reactions during the reduction e. g. epimerization of glucose into fructose. It is also possible to promote such secondary reactions, by which an isomeric hexitol is formed by suitably selecting the reaction conditions, so that besides sorbitol there are also formed large quantities of an isomeric alcohol.

The purpose of the invention may be attained by using two or more reaction chambers of different temperatures or by conducting the mixture to be converted through an elongated, e. g. tube-shaped reaction chamber in which the temperature is gradually raised from the inlet end to the outlet end. If different reaction chambers are used, the pressure in the said reaction chambers may be different.

When using a plurality of reaction chambers it will also be of advantage that they are of an elongated shape, in order to obtain a contact of a sufficiently long duration between the liquid and the hydrogen. In this case it will also be possible to conduct the mixture several times through the same reaction chamber. If desired the hydrogen, or the hydrogen containing gas mixture may also be circulated.

The reduction of the glucose starts at approximately 100° C. and will proceed quickly at temperatures of 140–150° C., without any noticeable formation of caramel. The most favourable temperature for the reduction of the dextrins is 180–200° C. For this reason the process is preferably carried out in such a way that the initial temperature is about 140–150° C. and that during the reaction the temperature is raised to over 180° C., e. g. to 200° C.

In order to obtain a finer division and a more intimate contact of longer duration between the hydrogen and the liquid to be reduced, the hydrogen may be supplied through very fine filters made e. g. of a porous ceramic material or of porous glass; or partitions, either perforated or not, may be provided in the reaction space, and the like.

The catalyst may be added as such to the liquid to be reduced. It is also possible, however, to make a suspension of the catalyst in a limited quantity of the liquid to be reduced or of the final product, in order to obtain a mixture that may be readily transported, e. g. a paste, whereby a uniform distribution of the catalyst throughout the material to be reduced, will be promoted.

If desired, one may also add to the reaction mixture a catalyst of acid, in order for promoting the hydrolysis of the polysaccharides present in the starting product, e. g. a small proportion of an acid.

The invention will now be further explained with the aid of the drawing in which Figure 1 represents an apparatus suitable for the process of the invention with one chamber and Figure 2 an apparatus with two chambers. The process will be described with reference to Figure 1.

*Example*

A 50% solution in water of commercial glucose (containing 7% of maltose and 12% by weight of dextrin calculated on the dry material is made and a nickel catalyst consisting of one part by weight of nickel and 4 parts by weight of diatomaceous earth is suspended in the said solution in a proportion of 30 grams on 1 liter of the solution. The suspension is introduced by means of the pump 1 into the lower portion of the reaction chamber consisting of the tube 2 which has a length of 1.5 meters and a diameter of 2.5 cm. The rate of speed at which the liquid is supplied is 150 grams of liquid per hour. At the same time a quantity of 0.5 $m^3$ of hydrogen (calculated at atmospheric pressure) per hour is introduced into the bottom portion of the tube via the pipe line on the right hand side by means of the pump 3.

The pressure in the reaction tube is 100 atm., the temperature in the lower part 140° C. and in the upper part 200° C. The liquid to be reduced and the hydrogen are both pumped through the reaction tube from the bottom towards the top, whereby an intimate contact between the liquid and the gas is obtained.

The mixture of liquid and gas discharged from the top of the reaction tube is cooled in the cooler 4 and subsequently passes through the separator 5. The liquid reaction product separated here is filtered in order to remove the catalyst; the resulting liquid consists of an approximately 50% sorbitol solution only containing traces of glucose and dextrin. The hydrogen discharged from the separator is returned to the reaction tube by means of the circulation pump 3, fresh hydrogen being supplied at the same time, if needed.

The catalyst may, as described above, be first suspended in a dry condition in the glucose solution or continuously added in the shape of a paste, e. g. in the pipe line between the pump 1 for the glucose solution and the reaction tube 2 by means of the pump 6.

The process may be carried out in a similar way in the apparatus illustrated in Figure 2. In this case the solution is first introduced into the chamber 2a in which the temperature is 140° C. and subsequently conducted to the chamber 2b in which the solution is heated to a temperature of 200° C.

We claim:

1. A process of manufacturing polyhydric alcohols substantially consisting of sorbitol by liquid phase continuous catalytic reduction of mixtures of glucose and polymers of glucose obtained by hydrolysis of starch, which comprises first heating said mixture in the presence of hydrogen and a hydrogenating catalyst at superatmospheric pressure to a temperature not exceeding 160° C., until at least the bulk of the glucose is reduced, and thereafter converting the polymers of glucose into sorbitol by continuing the hydrogenating treatment at a temperature above 180° C., but not so high as to effect splitting of the carbon-carbon bond, and stopping the hydrogenating treatment when said polymers of glucose have been reduced to sorbitol.

2. A process of manufacturing polyhydric alcohols substantially consisting of sorbitol by liquid phase continuous catalytic reduction of mixtures of glucose and polymers of glucose obtained by hydrolysis of starch, which comprises first heating said mixture in the presence of hydrogen and a hydrogenating catalyst at superatmospheric pressure to a temperature not exceeding 160° C., until at least the bulk of the glucose is reduced, and thereafter converting the polymers of glucose into sorbitol by continuing the hydrogenation treatment at a temperature of 180–200° C., and stopping the hydrogenation treatment when said polymers of glucose have been reduced to sorbitol.

3. A process of manufacturing polyhydric alcohols substantially consisting of sorbitol by liquid phase continuous catalytic reduction of mixtures of glucose and polymers of glucose obtained by hydrolysis of starch, which comprises first heating said mixture in the presence of hydrogen and a hydrogenating catalyst at superatmospheric pressure to a temperature of 120–160° C., until at least the bulk of the glucose is reduced, and thereafter converting the polymers of glucose into sorbitol by continuing the hydrogenating treatment at a temperature above 180° C., but not so high as to effect splitting of the carbon-carbon bond, and stopping the hydrogenating treatment when said polymers of glucose have been reduced to sorbitol.

4. A process of manufacturing polyhydric alcohols substantially consisting of sorbitol by liquid phase continuous catalytic reduction of mixtures of glucose and polymers of glucose obtained by hydrolysis of starch, which comprises first heating said mixture in the presence of hydrogen and a hydrogenating catalyst at superatmospheric pressure to a temperature of 120–160° C., until at least the bulk of the glucose is reduced, and thereafter converting the polymers of glucose into sorbitol by continuing the hydrogenation treatment at a temperature of 180–200° C., and stopping the hydrogenation treatment when said polymers of glucose have been reduced to sorbitol.

JAN LOLKEMA.
HENDRIK ADRIAAN van WESTEN.
JOHANNES CORNELIS VLUGTER.

REFERENCES CITED

The following references are of record in the file of this patent:

UNITED STATES PATENTS

| Number | Name | Date |
| --- | --- | --- |
| 1,990,245 | Mueller et al. | Feb. 5, 1935 |
| 2,004,135 | Rothrock | June 11, 1935 |
| 2,164,268 | Covert | June 27, 1939 |
| 2,271,083 | Lorand | Jan. 27, 1942 |
| 2,280,975 | Power | Apr. 28, 1942 |
| 2,292,293 | Rose | Aug. 4, 1942 |
| 2,335,731 | Bottoms | Nov. 30, 1943 |

FOREIGN PATENTS

| Number | Country | Date |
| --- | --- | --- |
| 528,064 | Great Britain | Oct. 22, 1940 |